United States Patent
Koizumi

(10) Patent No.: US 11,421,735 B2
(45) Date of Patent: Aug. 23, 2022

(54) BEARING DEVICE FOR VEHICLE WHEEL

(71) Applicant: NTN CORPORATION, Osaka (JP)

(72) Inventor: Souta Koizumi, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 17/273,405

(22) PCT Filed: Sep. 11, 2019

(86) PCT No.: PCT/JP2019/035670
§ 371 (c)(1),
(2) Date: Mar. 4, 2021

(87) PCT Pub. No.: WO2020/054758
PCT Pub. Date: Mar. 19, 2020

(65) Prior Publication Data
US 2021/0331519 A1     Oct. 28, 2021

(30) Foreign Application Priority Data

Sep. 11, 2018 (JP) .............................. JP2018-169499

(51) Int. Cl.
*B60B 27/00* (2006.01)
*F16C 33/41* (2006.01)
(Continued)

(52) U.S. Cl.
CPC ........ *F16C 33/418* (2013.01); *B60B 27/0094* (2013.01); *F16C 33/416* (2013.01);
(Continued)

(58) Field of Classification Search
CPC .... F16C 33/416; F16C 33/418; F16C 43/065; F16C 43/08; F16C 19/186; F16C 2326/02; B60B 2380/30; B60B 27/0094
See application file for complete search history.

(56) References Cited

U.S. PATENT DOCUMENTS 7,244,065 B2   7/2007 Takaki et al.
11,078,959 B1 *  8/2021 Zhong ................ F16C 33/3856
(Continued)

FOREIGN PATENT DOCUMENTS

JP    54-165639    11/1979
JP    06-056516    8/1994
(Continued)

OTHER PUBLICATIONS

International Search Report dated Oct. 15, 2019 in International (PCT) Application No. PCT/JP2019/035670.
(Continued)

*Primary Examiner* — Alan B Waits
(74) *Attorney, Agent, or Firm* — Wenderoth, Lind & Ponack, L.L.P.

(57) ABSTRACT

A vehicle wheel bearing device (1) is equipped with a cage (7) in which a pocket (Pt) is formed by adjacent pillar sections (7b) and a base section (7a) that is therebetween, and which retains a ball (8) in the pocket (Pt). Formed in the pillar sections (7b) are a claw portion (7e) and another short claw portion (7g) which project towards adjacent pillar sections, as well as a notched section (7i) cut toward the base section from the distal end radially inward of the claw portions of the pillar sections (7b). When viewed from the axial direction, the shortest length in the one claw portion (7e) to the center of the ball and the shortest length in the other short claw portion (7g) to the center of the ball are different.

4 Claims, 8 Drawing Sheets

(51) Int. Cl.
   *F16C 43/08* (2006.01)
   *F16C 19/18* (2006.01)
(52) U.S. Cl.
   CPC .......... *F16C 43/08* (2013.01); *B60B 2380/30* (2013.01); *F16C 19/186* (2013.01); *F16C 2326/02* (2013.01)

(56) References Cited

U.S. PATENT DOCUMENTS

| | | | | |
|---|---|---|---|---|
| 2005/0135719 | A1* | 6/2005 | Takaki | F16C 33/416 |
| | | | | 384/523 |
| 2009/0252446 | A1 | 10/2009 | Yokota et al. | |
| 2018/0223906 | A1* | 8/2018 | Kamamoto | F16C 33/418 |
| 2021/0331519 | A1* | 10/2021 | Koizumi | F16C 19/183 |

FOREIGN PATENT DOCUMENTS

| | | |
|---|---|---|
| JP | 2005-180630 | 7/2005 |
| JP | 2009-243609 | 10/2009 |
| JP | 2017-194141 | 10/2017 |

OTHER PUBLICATIONS

Notice of Reasons for Refusal dated May 10, 2022 in corresponding Japanese Patent Application No. 2018-169499, with English Translation, 8 pages.

Office Action dated Jul. 1, 2022 in corresponding Chinese Patent Application No. 201980055102.4, with English translation, 14 pages.

\* cited by examiner

BEARING DEVICE FOR VEHICLE WHEEL

TECHNICAL FIELD

The present invention relates to a bearing device for a vehicle wheel.

BACKGROUND ART

As is known in the related art, in a suspension system of, for example, an automobile, a bearing device for a vehicle wheel supports a vehicle wheel in a rotatable manner. In the bearing device for a vehicle wheel, an outer member supports an inner member including a hub ring, in a rotatable manner through a plurality of rolling elements (balls herein). The balls are circumferentially arranged in a cage at equidistant spacings, and are retained in the cage so that adjacent two of the balls do not come into contact with each other.

As is known in the related art, in such a bearing device for a vehicle wheel, reducing a circumferential thickness of a pillar section of a cage, the pillar section being interposed between adjacent balls, and increasing the number of balls by forming a notched section in the pillar section cause the cage to have no problem of insufficient strength, and enable an increase in life of the bearing. For example, Patent Literature 1 discloses a bearing device for a vehicle wheel.

As disclosed in Patent Literature 1, in the bearing device for a vehicle wheel, a cage made of a resin includes a pillar section of which a circumferential thickness is reduced, and the pillar section has a notched section at a position where adjacent balls are in closest proximity to each other. In other words, the pillar section is not interposed between adjacent balls at a position where the balls are in closest proximity to each other. The bearing device for a vehicle wheel is thus capable of retaining an increased number of balls without an increase in pitch circle diameter of the balls.

CITATIONS LIST

Patent Literature

Patent Literature 1: JP-A 2005-180630 Gazette

SUMMARY OF INVENTION

Technical Problems

In the cage disclosed in Patent Literature 1, the circumferential thickness of the pillar section is reduced for bringing the adjacent balls close to each other. In installing the balls in the cage, consequently, the ease of installing the balls in the cage is impaired in some cases.

The present invention has been made in view of the circumstances described above, and provides a bearing device for a vehicle wheel, the bearing device being capable of improving the ease of installing balls in a cage while also increasing the number of balls.

Solutions to Problems

Specifically, a bearing device for a vehicle wheel according to the present invention includes: an outer member having, on its inner periphery, double row outer raceway surfaces; an inner member including: a hub ring having, on its outer periphery, a small-diameter step portion extending axially; and at least one inner ring press-fitted to the small-diameter step portion, the inner member having, on its outer periphery, double row inner raceway surfaces facing the double row outer raceway surfaces; double row balls rollably accommodated between the raceway surfaces of the outer member and the raceway surfaces of the inner member, respectively; and a cage made of a resin, the cage including: a base section having a ring shape; and a plurality of pillar sections extending axially from the base section and circumferentially arranged at certain spacings, the cage having a pocket defined by adjacent two of the pillar sections and the base section and having a curved face extending along an outer peripheral face of a corresponding one of the balls so as to retain the ball. In the bearing device for a vehicle wheel according to the present invention, preferably, each pillar section of the cage includes: one claw portion and another claw portion projecting toward the pillar sections adjacent to the pillar section, respectively; and a notched section cut toward the base section from a distal end of the pillar section, and when viewed from the axial direction, a shortest length in the one claw portion to a center of the ball and a shortest length in the other claw portion to the center of the ball are different.

In the bearing device for a vehicle wheel according to the present invention, when viewed from the axial direction, a portion of the one claw portion where the length to the center of the ball is shortest and a portion of the other claw portion where the length to the center of the ball is shortest fall within a ring-shaped range surrounded with an outer peripheral circle of the ball and an imaginary circle having a diameter that is not less than 0.7 times and less than 1.0 time a diameter of the ball with the center of the ball defined as a center of the imaginary circle.

In the bearing device for a vehicle wheel according to the present invention, when viewed from the axial direction, a sum of the shortest length in the one claw portion to the center of the ball and the shortest length in the other claw portion to the center of the ball is 0.7 times larger than a diameter of the ball and is not more than 0.85 times the diameter of the ball.

A bearing device for a vehicle wheel according to the present invention includes: an outer member having, on its inner periphery, double row outer raceway surfaces; an inner member including: a hub ring having, on its outer periphery, a small-diameter step portion extending axially; and at least one inner ring press-fitted to the small-diameter step portion, the inner member having, on its outer periphery, double row inner raceway surfaces facing the double row outer raceway surfaces; double row balls rollably accommodated between the raceway surfaces of the outer member and the raceway surfaces of the inner member, respectively; and a cage made of a resin, the cage including: a base section having a ring shape; and a plurality of pillar sections extending axially from the base section and circumferentially arranged at certain spacings, the cage having a pocket defined by adjacent two of the pillar sections and the base section and having a curved face extending along an outer peripheral face of a corresponding one of the balls so as to retain the ball. In the bearing device for a vehicle wheel according to the present invention, each pillar section of the cage includes: a claw portion projecting toward one of the pillar sections adjacent to the pillar section; and a notched section extending from a distal end of the pillar section toward the base section, and when viewed from the axial direction, the claw portion has a distal end falling within a ring-shaped range surrounded with an outer peripheral circle of the ball and a reference imaginary circle having a predetermined radius with a center of the ball defined as a center of the reference imaginary circle.

Advantageous Effects of Invention

The present invention produces the following advantageous effects.

In the bearing device for a vehicle wheel according to the present invention, each pillar section of the cage includes the notched section that makes adjacent two of the balls close to each other. Therefore, the bearing device for a vehicle wheel according to the present invention is capable of retaining an increased number of balls. When viewed from the axial direction, a region where the one claw portion retaining the ball overlaps the ball and a region where the other claw portion retaining the ball overlaps the ball are different from each other. Therefore, the two claw portions come into contact with the ball at different timings. The pillar sections are thus elastically deformed in the circumferential direction in which the pillar sections are apt to be deformed. The bearing device for a vehicle wheel is thus capable of improving the ease of installing the balls in the cage while also increasing the number of balls to be installed in the cage.

In the bearing device for a vehicle wheel according to the present invention, the upper limit is set as to the regions where the one claw portion and the other claw portion overlap the ball in the cage when viewed from the axial direction of the cage. Therefore, the amount of deformation of each pillar portion of the cage is restricted in inserting the plurality of balls into the pockets of the cage along the axial direction of the cage. The bearing device for a vehicle wheel is thus capable of improving the ease of installing the balls in the cage while also increasing the number of balls.

In the bearing device for a vehicle wheel according to the present invention, when viewed from the axial direction, the sum of the region where the one claw portion overlaps the ball and the region where the other claw portion overlaps the ball falls within a certain range in the cage. Therefore, the amount of deformation of each pillar portion of the cage is restricted in inserting the plurality of balls into the pockets of the cage along the axial direction of the cage while the cage maintains its retaining capability. The bearing device for a vehicle wheel is thus capable of improving the ease of installing the balls in the cage while also increasing the number of balls.

In the bearing device for a vehicle wheel according to the present invention, each pillar section includes the claw portion on one side in the circumferential direction. In inserting the balls into the pockets of the cage, the pillar sections are elastically deformed in the circumferential direction in which the pillar sections are apt to be deformed. The bearing device for a vehicle wheel is thus capable of improving the ease of installing the balls in the cage while also increasing the number of balls.

DESCRIPTION OF EMBODIMENTS

Figure 1:
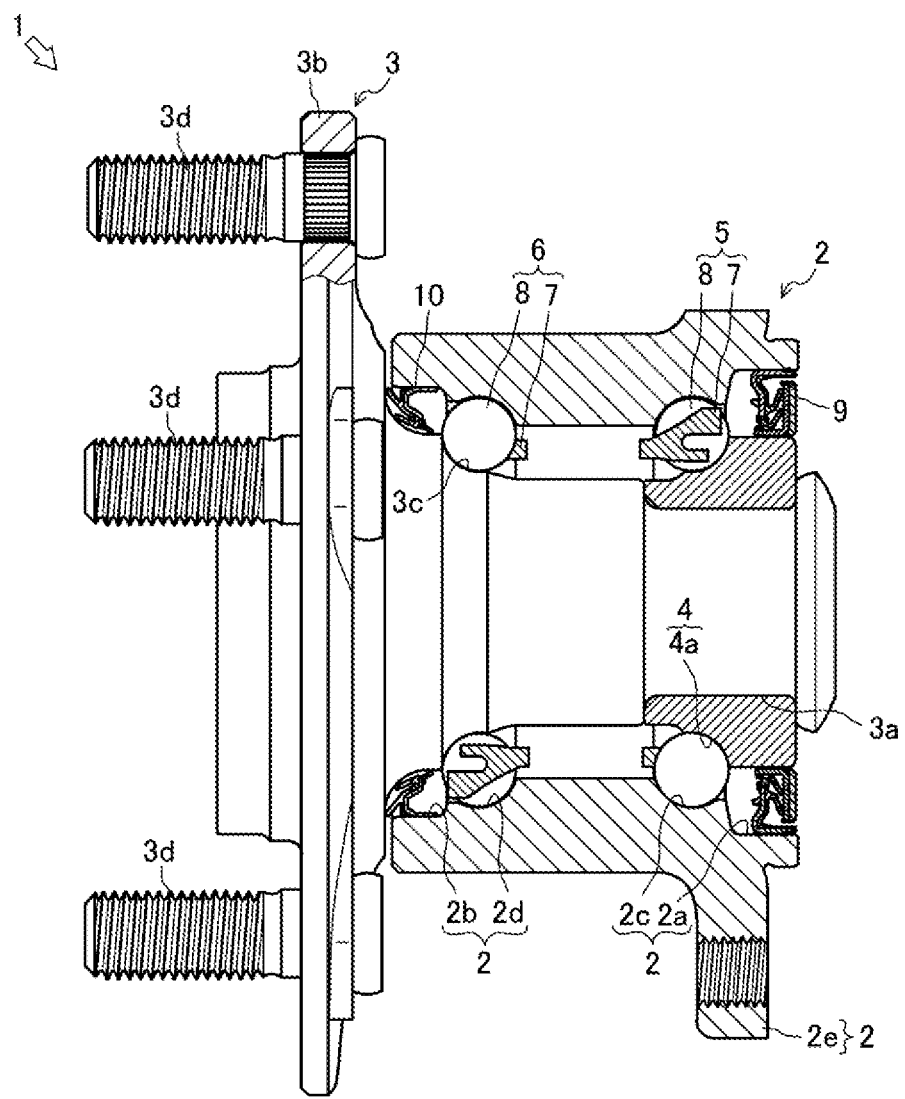
FIG. 1 is a sectional view that illustrates an overall configuration of a bearing device for a vehicle wheel according to a first embodiment.
Figure 2:
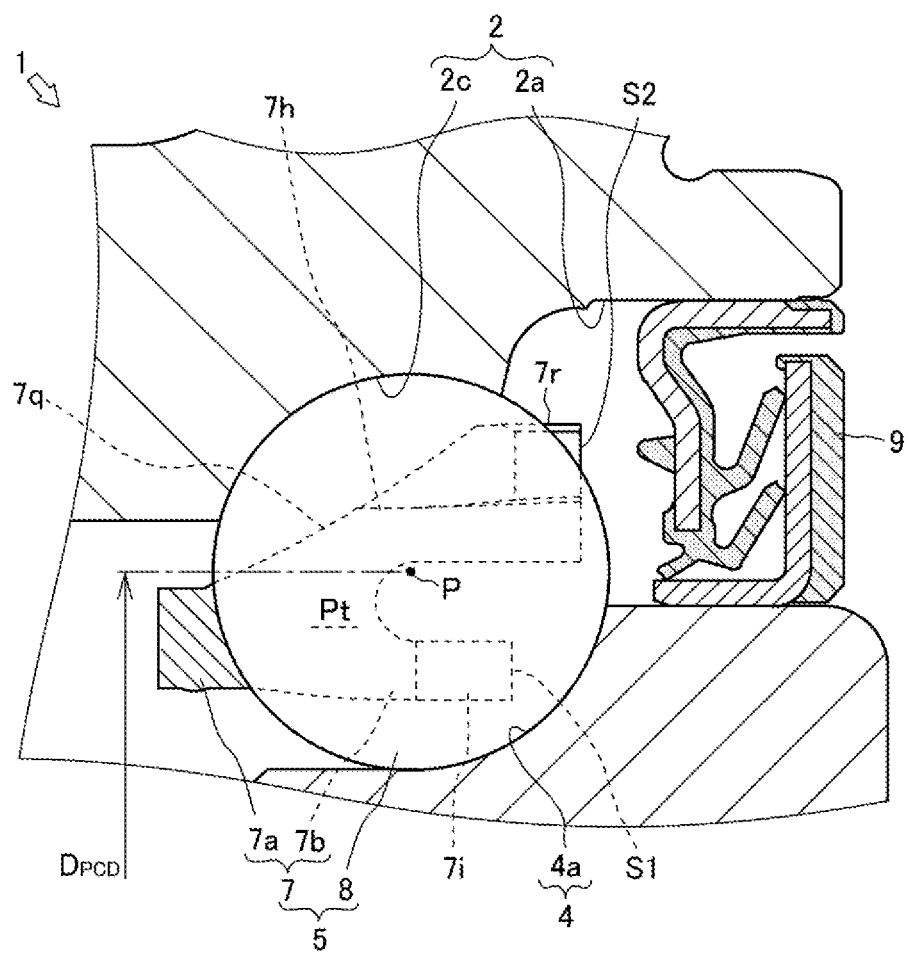
FIG. 2 is an enlarged sectional view that illustrates a configuration of a ball and a cage in the bearing device for a vehicle wheel according to the first embodiment.

With reference to FIGS. 1 and 2, a description will be given of a bearing device for a vehicle wheel 1 as a bearing device for a vehicle wheel according to an embodiment of the present invention.

As illustrated in FIG. 1, the bearing device for a vehicle wheel 1 is configured to support a vehicle wheel in a rotatable manner in a suspension system of a vehicle such as an automobile. The bearing device for a vehicle wheel 1 includes: an outer ring 2 as an outer member; a hub ring 3 and an inner ring 4 as an inner member; an inner-side ball row 5 and an outer-side ball row 6 as double rolling element rows; an inner-side sealing member 9 as a sealing member; and an outer-side sealing member 10 as a sealing member. The term "inner side" used herein refers to a side of the bearing device for a vehicle wheel 1 facing a vehicle body in a state in which the bearing device for a vehicle wheel 1 is mounted to the vehicle body. The term "outer side" used herein refers to a side of the bearing device for a vehicle wheel 1 facing the vehicle wheel in the state in which the bearing device for a vehicle wheel 1 is mounted to the vehicle body. The term "axial direction", "axial", or "axially" used herein refers to a direction parallel to an axis of rotation of the bearing device for a vehicle wheel 1. The term "radial direction", "radial", or "radially" used herein refers to a direction perpendicular to the axis of rotation of the bearing device for a vehicle wheel 1. The term "circumferential direction", "circumferential", or "circumferentially" used herein refers to a direction along an arc about the axis of rotation of the bearing device for a vehicle wheel 1.

The outer ring 2 is configured to support the hub ring 3 and the inner ring 4 through the inner-side ball row 5 and the outer-side ball row 6. The outer ring 2 has a substantially cylindrical shape. The outer ring 2 has, in its inner-side end, an inner-side opening 2a into which the inner-side sealing member 9 is fittable. The outer ring 2 has, in its outer-side end, an outer-side opening 2b into which the outer-side sealing member 10 is fittable.

The outer ring 2 has, on its inner peripheral face, an outer raceway surface 2c located on the inner side and an outer raceway surface 2d located on the outer side. The outer ring 2 has, on its outer peripheral face, an integrated vehicle body mounting flange 2e to be mounted to a knuckle of the suspension system.

The hub ring 3 is configured to support the vehicle wheel of the vehicle in a rotatable manner. The hub ring 3 has a columnar shape. The hub ring 3 has, on its inner-side end, a small-diameter step portion 3a whose diameter is decreased on an outer peripheral face. The hub ring 3 has, on its outer-side end, an integrated vehicle wheel mounting flange 3b for mounting the vehicle wheel. Hub bolts 3d are inserted into the vehicle wheel mounting flange 3b at circumferentially equidistant positions. The hub ring 3 is disposed such that the inner raceway surface 3c on the outer side faces the outer raceway surface 2d on the outer side of the outer ring 2. The inner ring 4 is fitted to the small-diameter step portion 3a of the hub ring 3.

The inner ring 4 is configured to apply a preload to the inner-side ball row 5 and the outer-side ball row 6. The inner ring 4 has, on its outer peripheral face, an inner raceway surface 4a having a ring shape and extending circumferentially. The inner ring 4 is fixed by crimp to the inner-side end of the hub ring 3. In other words, the inner ring 4 forms the inner raceway surface 4a on the inner side of the hub ring 3. The inner ring 4 is disposed such that the inner raceway surface 4a faces the outer raceway surface 2c on the inner side of the outer ring 2.

The inner-side ball row 5 and the outer-side ball row 6 each have a configuration in which a plurality of balls 8 as rolling elements are arranged in a ring shape and retained in a cage 7 made of a resin. The inner-side ball row 5 is rollably sandwiched between the inner raceway surface 4a of the inner ring 4 and the outer raceway surface 2c on the inner side of the outer ring 2. The outer-side ball row 6 is rollably sandwiched between the inner raceway surface 3c of the hub ring 3 and the outer raceway surface 2d on the outer side of the outer ring 2.

The cage 7 is configured to retain the balls 8. The cage 7 is made of a synthetic resin excellent in oil resistance, wear resistance, and lubricity, and examples of the synthetic resin may include, but not limited to, polyamide 46 (PA46), polyamide 66 (PA66), polyamide 9T (PA9T), polyether ether ketone (PEEK), and polyphenylene sulfide (PPS). The resin to be used herein may contain a reinforcing material such as glass fiber or carbon fiber.

As illustrated in FIG. 2, the cage 7 includes a base section 7a having a ring shape, and a plurality of pillar sections 7b. The pillar sections 7b project axially from the base section 7a. The pillar sections 7b are arranged at equidistant spacings in the circumferential direction of the base section 7a. The cage 7 has a plurality of pockets Pt for retaining the balls 8 independently of one another. The pockets Pt are each located between adjacent two of the pillar sections 7b, and are arranged at equidistant spacings (see FIG. 3).

Each ball 8 is, for example, a steel ball made of high carbon chromium bearing steel SUJ2. The balls 8 are rotatably retained in the pockets Pt of the cage 7.

The inner-side sealing member 9 is configured to seal a clearance between the inner-side opening 2a in the outer ring 2 and the inner ring 4. The inner-side sealing member 9 is, for example, a pack seal of a two-side lip type in which two seal lips are brought into contact with each other. The inner-side sealing member 9 includes a sealing plate having a substantially cylindrical shape, and a slinger having a substantially cylindrical shape.

The outer-side sealing member 10 is configured to seal a clearance between the outer-side opening 2b in the outer ring 2 and the hub ring 3. The outer-side sealing member 10 includes a core formed into a substantially cylindrical shape from a steel plate equal in material to the sealing plate, and a plurality of seal lips made of, for example, synthetic rubber such as acrylonitrile-butadiene rubber (NBR) and fixedly bonded to the core.

With reference to FIGS. 2 to 5B, next, a specific description will be given of the cage 7. As illustrated in FIG. 2, the base section 7a is located closer to the inner diameter side than a pitch circle PCD of the balls 8 is. In the present embodiment, the entire base section 7a is located closer to the inner diameter side than the pitch circle PCD is. Alternatively, a part of the base section 7a may be located closer to the outer diameter side than the pitch circle PCD is. In FIG. 2, "DPCD" indicates the pitch circle PCD of the balls 8.

Each pillar section 7b has an inner diameter face extending axially. Each pillar section 7b has, on its outer diameter face, a first portion 7q extending from a distal end of the base section 7a while being radially inclined outward so as to be far from an outer peripheral face of the base section 7a, and a second portion 7r extending axially and horizontally from the first portion 7q. In other words, each pillar section 7b has the first portion 7q whose radial width gradually increases from the base section 7a toward a distal end of the pillar section 7b. In each pillar section 7b, the outer diameter face (an outer pillar 7j to be described later) projects axially outward more than the inner diameter face (an inner pillar 7k to be described later) projects.

Figure 3:
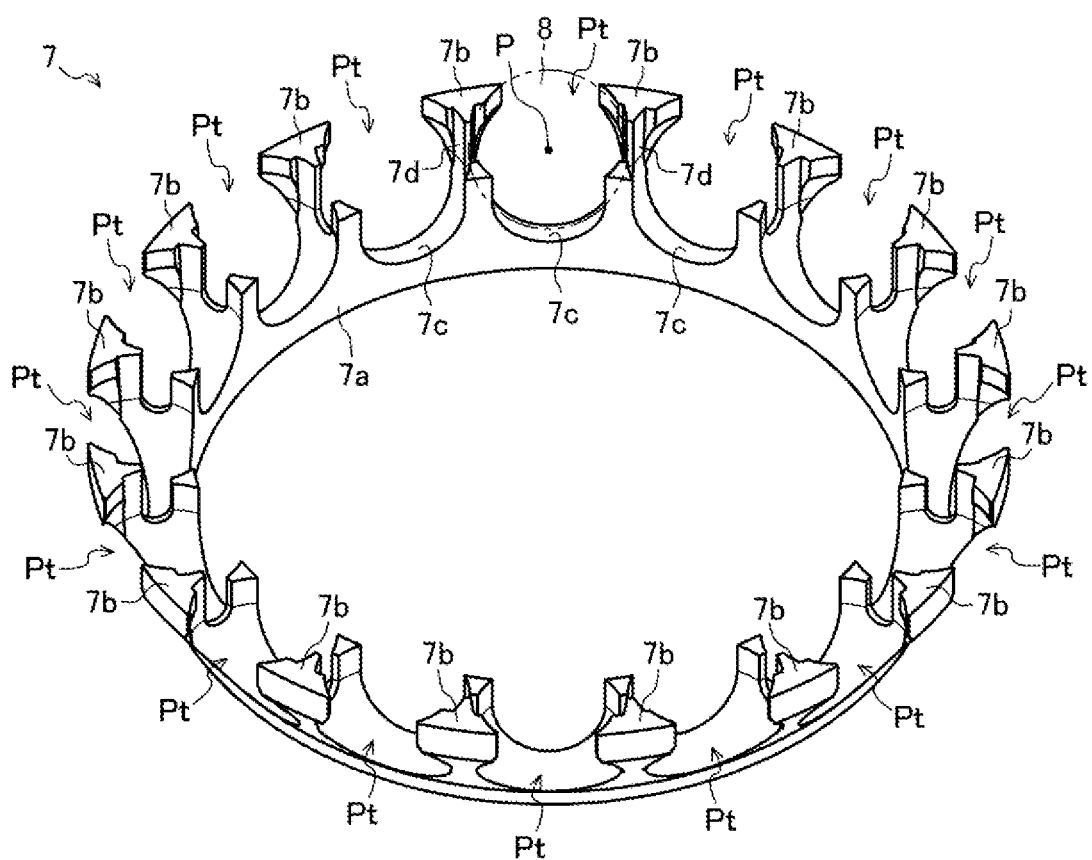
FIG. 3 is a perspective view that illustrates an overall configuration of the cage in the bearing device for a vehicle wheel according to the first embodiment.
Figure 4:
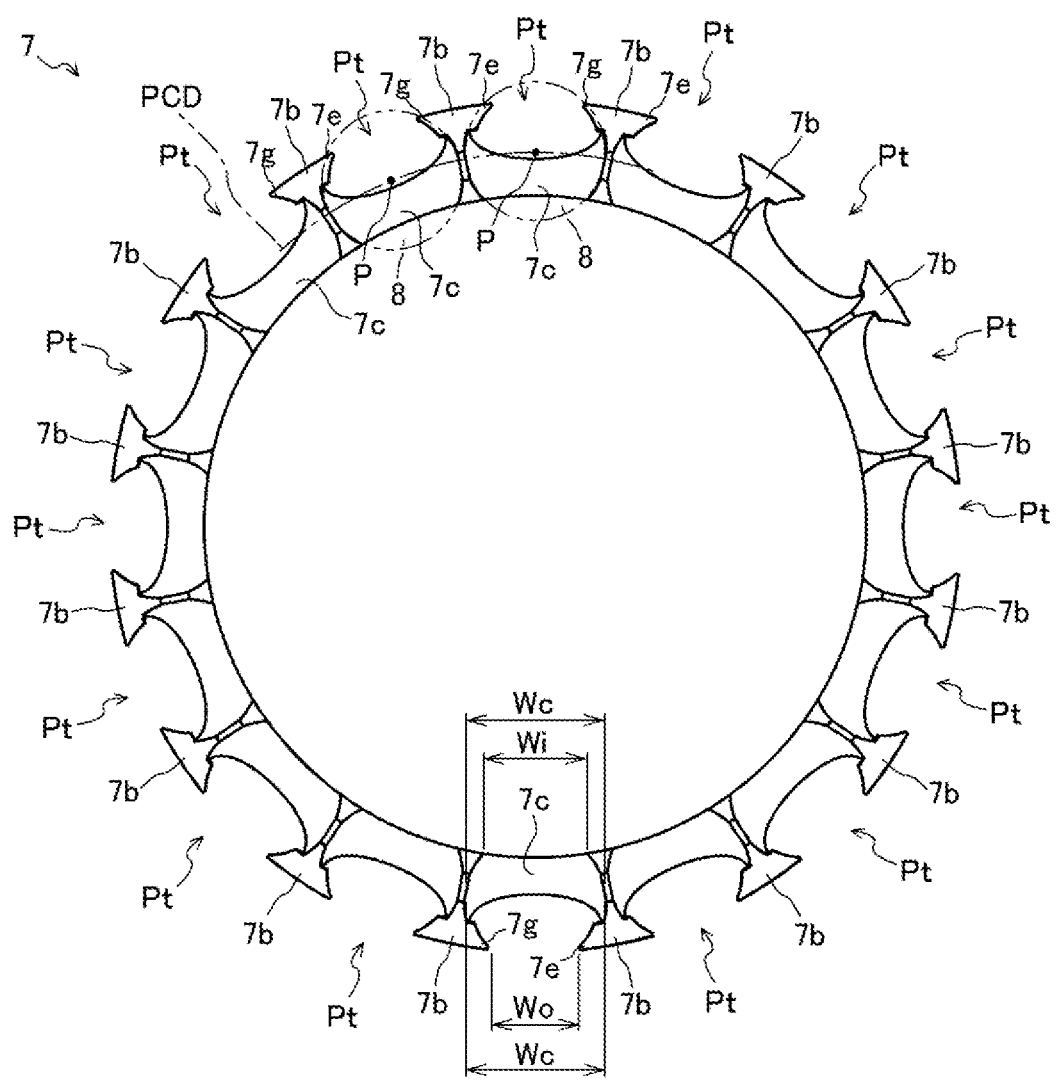
FIG. 4 is a plan view that illustrates the overall configuration of the cage in the bearing device for a vehicle wheel according to the first embodiment.

As illustrated in FIGS. 3 and 4, the cage 7 has concave curved faces 7c each defined by side faces of adjacent two of the pillar sections 7b, the side faces facing each other and being closer to the base section 7a, and a portion of the base section 7a located between the adjacent pillar sections 7b. Each concave curved face 7c extends along an outer peripheral face of the corresponding ball 8 whose center is located at a predetermined position P (see FIG. 2). In addition, each concave curved face 7c has a substantially hemispherical shape whose bottom is defined by the base section 7a. Each pillar section 7b has a guideway 7d extending axially and straight from an edge of the concave curved face 7c having the hemispherical shape, toward the distal end of the pillar section 7b. The guideways 7d guide the balls 8 from the distal ends of the pillar sections 7b to spaces surrounded with the concave curved faces 7c. In the cage 7, the pockets Pt for retaining the balls 8 are each defined by the concave curved face 7c and the guideways 7d at the position between the adjacent pillar sections 7b, and are arranged at equidistant spacings.

As illustrated in FIG. 4, a minimum distance between adjacent two of the balls 8 on the pitch circle PCD is restricted since each ball 8 is in contact with inner faces of the corresponding pillar sections 7*b*. The thickness of each pillar section 7*b* is smallest on the pitch circle PCD, and gradually increases toward the inner diameter side and the outer diameter side with respect to the pitch circle PCD.

In adjacent two of the pillar sections 7*b*, the concave curved face 7*c* and the guideways 7*d* (see FIG. 3) are curved with a substantially central portion in radial width between the pillar sections 7*b* defined as a bottom when viewed from the axial direction. A distance between the adjacent pillar sections 7*b* is set such that a distance Wi between radially inner ends of the pillar sections 7*b* and a distance Wo between radially outer ends of the pillar sections 7*b* are smaller than a distance We between substantially radial centers of the pillar sections 7*b*. The adjacent pillar sections 7*b* thus restrict a radially inward movement and a radially outward movement of the corresponding ball 8 retained in the pocket Pt. Each pillar section 7*b* has, on its distal end, a long claw portion 7*e* as one claw portion projecting toward the adjacent pillar section 7*b* on one side in the circumferential direction, and a short claw portion 7*g* as another claw portion projecting toward the adjacent pillar section 7*b* on another side in the circumferential direction. In other words, each pillar section 7*b* has, on its distal end, the long claw portion 7*e* projecting toward one side in the circumferential direction, and the short claw portion 7*g* projecting toward another side in the circumferential direction.

Figure 5A:
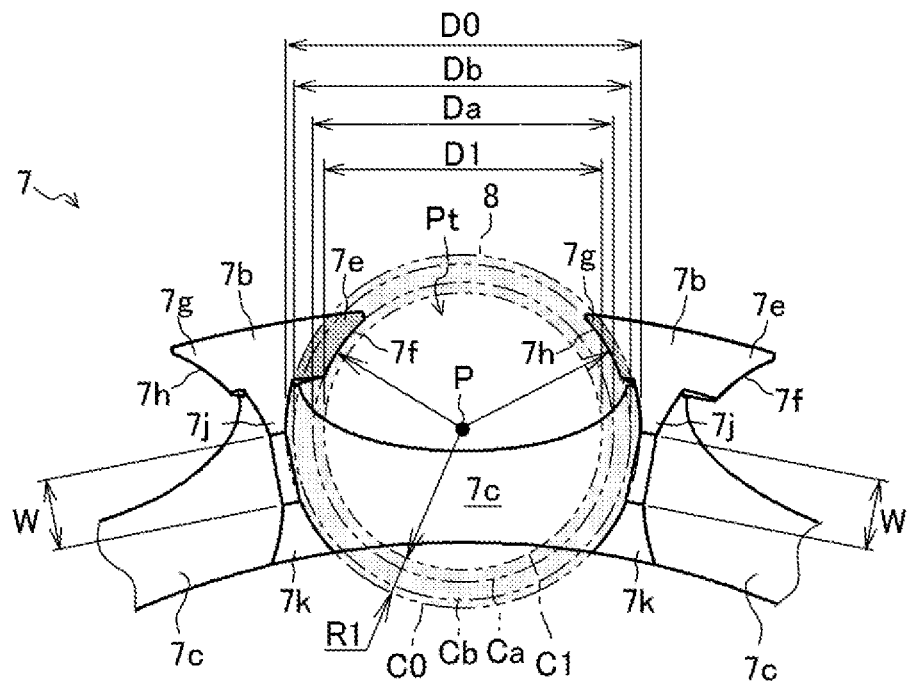
FIG. 5A is a partially enlarged plan view that illustrates a relationship between a claw portion of the cage and the ball in the bearing device for a vehicle wheel according to the first embodiment.

As illustrated in FIG. 5A, in the adjacent pillar sections 7*b*, the long claw portion 7*e* of one of the pillar sections 7*b* and the short claw portion 7*g* of the other pillar section 7*b* each have a distal end that falls within a ring-shaped range (a light gray portion) having a radial width R1. The ring-shaped range is surrounded with a reference imaginary circle C1 having a diameter D1 about the predetermined position P and an outer peripheral circle C0 of the ball 8 having a diameter D0 when viewed from the axial direction. The reference imaginary circle C1 is concentric with the outer peripheral circle C0 of the ball 8. The diameter D1 of the reference imaginary circle C1 is smaller than the diameter D0 of the outer peripheral circle C0. Specifically, the diameter D1 of the reference imaginary circle C1 is not less than 0.7 and less than 1.0 time the diameter D0 of the ball 8.

The long claw portion 7*e* and the short claw portion 7*g* each have a pocket Pt-side (radially inner) distal end notched in a chamfered shape so as to fall within the range having the radial width R1. The long claw portion 7*e* has, on its distal end, a long claw guideway 7*f* The long claw guideway 7*f* is an arc face extending along a given imaginary circle Ca having a diameter Da. When viewed from the axial direction, the imaginary circle Ca is larger than the reference imaginary circle C1 having the diameter D1, and is smaller than the outer peripheral circle C0 of the ball 8 having the diameter D0. In the long claw portion 7*e*, the long claw guideway 7*f* is in closest proximity to the center of the ball 8. In other words, a length between the long claw guideway 7*f* and the center of the ball 8 is shortest in the long claw portion 7*e*. The short claw portion 7*g* has, on its distal end, a short claw guideway 7*h*. The short claw guideway 7*h* is an arc face extending along a given imaginary circle Cb having a diameter Db. When viewed from the axial direction, the imaginary circle Cb is larger than the imaginary circle Ca having the diameter Da, and is smaller than the outer peripheral circle C0 of the ball 8 having the diameter D0. In the short claw portion 7*g*, the short claw guideway 7*h* is in closest proximity to the center of the ball 8. In other words, a length between the short claw guideway 7*h* and the center of the ball 8 is shortest in the short claw portion 7*g*.

The long claw guideway 7*f* is located away from the center (the predetermined position P) of the ball 8 by a half of the diameter Da of the imaginary circle Ca (a radius of the imaginary circle Ca) when viewed from the axial direction. The short claw guideway 7*h* is located away from the center of the ball 8 by a half of the diameter Db of the imaginary circle Cb (a radius of the imaginary circle Cb) when viewed from the axial direction. In other words, the long claw portion 7*e* is different from the short claw portion 7*g* in the length from the portion, which is in closest proximity to the center of the ball 8, to the center of the ball 8 (the shortest length to the center of the ball 8) when viewed from the axial direction. In the long claw portion 7*e* and the short claw portion 7*g*, when viewed from the axial direction, a sum of the length from the center of the ball 8 to the long claw guideway 7*f* and the length from the center of the ball 8 to the short claw guideway 7*h* is 0.7 times larger than the diameter D0 of the ball 8, and is not more than 0.85 times the diameter D0 of the ball 8. It should be noted that this value is calculated from the range of the reference imaginary circle C1. In a case where the long claw portion 7*e* or the short claw portion 7*g* does not overlap the ball 8 when viewed from the axial direction, the length to the center of the ball 8 corresponds to a half of the diameter D0 (a radius of the outer peripheral circle C0).

The long claw portion 7*e* and the short claw portion 7*g* each have the distal end that is in contact with the outer peripheral face of the ball 8 whose center is located at the predetermined position P. This restricts the axial movement of the ball 8 retained in the pocket Pt. The long claw guideway 7*f* and the short claw guideway 7*h* are curved faces extending along the imaginary circle Ca, but may be faces that approximate to the imaginary circle Ca.

In the long claw portion 7*e*, a portion extending from the outer peripheral circle C0 of the ball 8 to the long claw guideway 7*f* (the imaginary circle Ca) corresponds to a region overlapping the ball 8 when viewed from the axial direction (see a dark gray portion). Likewise, in the short claw portion 7*g*, a portion extending from the outer peripheral circle C0 of the ball 8 to the short claw guideway 7*h* (the imaginary circle Cb) corresponds to a region overlapping the ball 8 when viewed from the axial direction (see a dark gray portion). The long claw guideway 7*f* is closer to the center of the ball 8 than the short claw guideway 7*h* is when viewed from the axial direction. In other words, a region where the long claw portion 7*e* overlaps the ball 8 when viewed from the axial direction is larger than a region where the short claw portion 7*g* overlaps the ball 8 when viewed from the axial direction. In addition, the long claw portion 7*e* and the short claw portion 7*g* are formed such that a total value of the size of the region where the long claw portion 7*e* overlaps the ball 8 when viewed from the axial direction and the size of the region where the short claw portion 7*g* overlaps the ball 8 when viewed from the axial direction falls within a certain range. Therefore, upper and lower limits of the size of the region where the long claw portion 7*e* overlaps the ball 8 when viewed from the axial direction as well as upper and lower limits of the size of the region where the short claw portion 7*g* overlaps the ball 8 when viewed from the axial direction are set in relation to the shapes of the long claw portion 7*e* and short claw portion 7*g*.

Figure 5B:
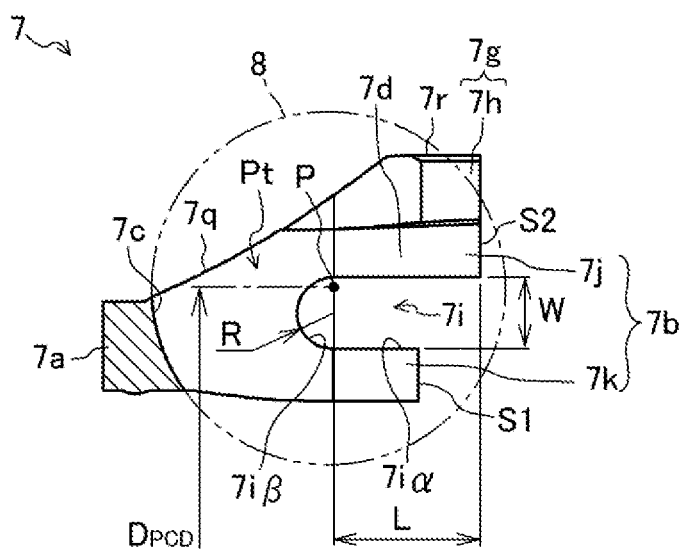
FIG. 5B is a partially enlarged sectional view that illustrates a notched section of the cage in the bearing device for a vehicle wheel according to the first embodiment.

As illustrated in FIG. 5B, each pillar section 7*b* has, in its substantially central portion in radial width, a notched section 7*i* including a slit 7*iα* extending from the distal end to the base section 7*a* and having a radial width W and an axial length L, and a curved face 7*iβ* having a radius R. The notched section 7*i* (the curved face 7*iβ*) has a bottom closer to the base section 7a than the predetermined position P is. In other words, the notched section 7i covers the predetermined position P. As described above, in the cage 7, at the predetermined position P set such that the distance between the adjacent balls 8 becomes shortest, since the bottom of the notched section 7i is located closer to the base section 7a than the predetermined position P, the distance between the adjacent balls 8 is shortened. The cage 7 is thus capable of retaining an increased number of balls 8.

The curved face 7iβ corresponds to a terminal end of the slit 7iα. The notched section 7i divides the pillar section 7b into a pillar located outside in the radial direction (hereinafter, simply referred to as an "outer pillar 7j") and a pillar located inside in the radial direction (hereinafter, simply referred to as an "inner pillar 7k"). The outer pillar 7j has, on its distal end, the long claw portion 7e located on one side in the circumferential direction, and the short claw portion 7g located on another side in the circumferential direction. The notched section 7i is formed by removing a portion having no required strength around substantially the central portion in the radial direction. At this portion, the thickness of the pillar section 7b becomes smallest by the concave curved face 7c and the guideway 7d. In the cage 7, the strength of each pillar section 7b can be ensured even when the number of balls 8 to be retained is increased by shortening the distance between the adjacent balls 8 on the pitch circle PCD.

In addition, the center (the predetermined position P) of the ball 8 falls within the radial width range of the notched section 7i. In the present embodiment, the center of the ball 8 is closer to the outer diameter side than the center in radial width of the notched section 7i is. The notched section 7i has a radius R that is 0.05 times larger than the diameter D0 of the ball 8, and is 0.3 times smaller than the diameter D0 of the ball 8 (0.05<R/D0<0.3). When the radius R is 0.05 times smaller than the diameter D0 of the ball 8, the ease of installing the ball 8 in the cage 7 is deteriorated. When the radius R is 0.3 times larger than the diameter D0 of the ball 8, the rigidity of the cage 7 is lowered.

In addition, the radial width W of the notched section 7i is set to be 0.2 times larger than the diameter D0 of the ball 8 and 0.5 times smaller than the diameter D0 of the ball 8 (0.2<W/D0<0.5). When the radial width W is 0.2 times smaller than the diameter D0 of the ball 8, the ball 8 cannot be installed in the cage 7. When the radial width W is 0.5 times larger than the diameter D0 of the ball 8, the cage 7 has no pillar sections 7b, and is therefore incapable of retaining the balls 8. As described above, the cage 7 retains the balls 8 such that adjacent two of the balls 8 face together in a contactless manner on the pitch circle PCD.

The cage 7 and balls 8 configured as described above form the inner-side ball row 5 and outer-side ball row 6. The bearing device for a vehicle wheel 1 is therefore capable of improving relative positional accuracy between the outer ring 2 and the hub ring 3 and inner ring 4, thereby receiving a uniform load in every radial direction. The bearing device for a vehicle wheel 1 is capable of retaining an increased number of balls 8 on the single pitch circle PCD. Therefore, each ball 8 receives a reduced bearing load, leading to improvement in life of the bearing device for a vehicle wheel 1 and reduction in weight and size of the bearing device for a vehicle wheel 1. In the inner-side ball row 5 and the outer-side ball row 6, the balls 8 are supported by the pockets Pt of the cage 7 independently of one another, and therefore generate no noise by friction and contact between the balls 8.

As illustrated in FIGS. 2 and 5B, an axial end face 51 of the inner pillar 7k is offset closer to the center (the predetermined position P) of the corresponding ball 8 than an axial end face S2 of the outer pillar 7j is. The axial end face 51 of the inner pillar 7k is located axially outward with respect to the center of the ball 8. The imaginary circle Ca is specified such that the ball 8 passes a point where the ball 8 simultaneously comes into contact with the inner pillar 7k and the long claw portion 7e which are adjacent to each other. In addition, the imaginary circle Cb is specified such that the imaginary circle Cb passes a point where the ball 8 simultaneously comes into contact with the inner pillar 7k and the short claw portion 7g which are adjacent to each other.

In the cage 7, the inner pillar 7k is offset closer to the center of the ball 8 than the axial end face S2 of the outer pillar 7j is. Therefore, the diameter Da of the imaginary circle Ca and the diameter Db of the imaginary circle Cb can be increased as compared with a case where the axial end face of the outer pillar 7j and the axial end face of the inner pillar 7k are at the same position. With regard to the imaginary circle Ca and the imaginary circle Cb, adjusting the axial position of the inner pillar 7k enables an improvement of the degree of freedom in designing the distal end of the long claw portion 7e and the distal end of the short claw portion 7g within the range in the radial width R1 (not less than 0.7 times the diameter D0 of the ball 8 and less than 1 time the diameter D0 of the ball 8).

Next, with reference to FIGS. 6A to 7C, a description will be given of a deformed state of the cage 7 in installing the balls 8 in the cage 7. It is assumed that the balls 8 are moved only in the axial direction by, for example, a ball inserting tool (not illustrated).

Figure 6A:
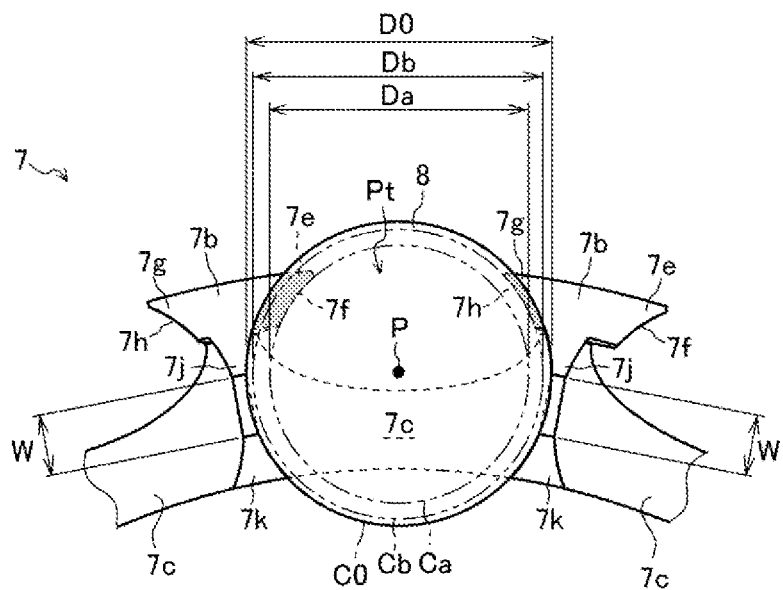
FIG. 6A is a partially enlarged plan view that illustrates a relationship between the cage and the ball before installation of the ball, in the bearing device for a vehicle wheel according to the first embodiment.
Figure 6B:
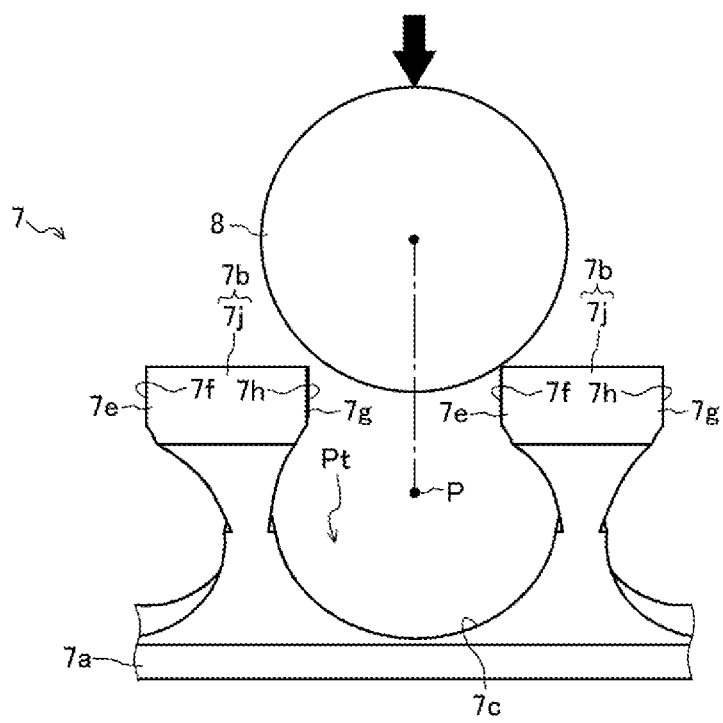
FIG. 6B is a partially enlarged side view that illustrates the relationship between the cage and the ball before installation of the ball, in the bearing device for a vehicle wheel according to the first embodiment.

As illustrated in FIG. 6A, in installing each ball 8 in the corresponding pocket Pt of the cage 7, the ball 8 is axially inserted from the distal ends of the adjacent pillar sections 7b toward the base section 7a of the cage 7 in the state in which the center of the ball 8 overlaps the predetermined position P when viewed from the axial direction (see a black arrow in FIG. 6B).

As illustrated in FIG. 6B, first, in one of the adjacent pillar sections 7b, the long claw guideway 7f of the long claw portion 7e on the one side of the outer pillar 7j in the circumferential direction comes into contact with the outer peripheral face of the ball 8. The long claw guideway 7f is in contact with the outer peripheral face of the ball 8 at a position where the long claw guideway 7f overlaps the given imaginary circle Ca having the diameter Da. The imaginary circle Ca has the radial width R1 (see FIG. 5) that is not less than 0.8 times the diameter D0 of the ball 8 and is less than 1 time the diameter D0 of the ball 8 when viewed from the axial direction. On the other hand, in the other pillar section 7b, the short claw guideway 7h of the short claw portion 7g on the other side of the outer pillar 7j in the circumferential direction is not in contact with the outer peripheral face of the ball 8 since the short claw guideway 7h is located at a position where the short claw guideway 7h overlaps the imaginary circle Cb larger than the imaginary circle Ca when viewed from the axial direction.

Figure 7A:
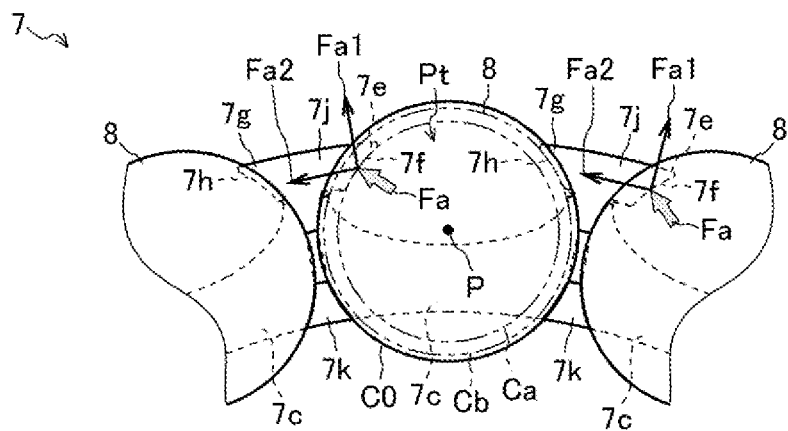
FIG. 7A is a partially enlarged plan view that illustrates a state in which the ball is in contact with a long claw portion of the cage in the bearing device for a vehicle wheel according to the first embodiment, in installing the ball in the cage.

As illustrated in FIG. 7A, each long claw portion 7e receives, from the corresponding ball 8, one-side external force Fa (a light gray arrow) applied in a direction from the center of the ball 8 to the contact position of the long claw portion 7e with the outer peripheral face. In other words, each outer pillar 7j simultaneously receives, as a component of the one-side external force Fa, a radial component Fa1 directed radially outward and a circumferential component Fa2 directed to another side in the circumferential direction. On the other hand, each short claw guideway 7h receives no force since it is not in contact with the outer peripheral face of the corresponding ball 8 (see FIG. 6B).

Figure 7B:
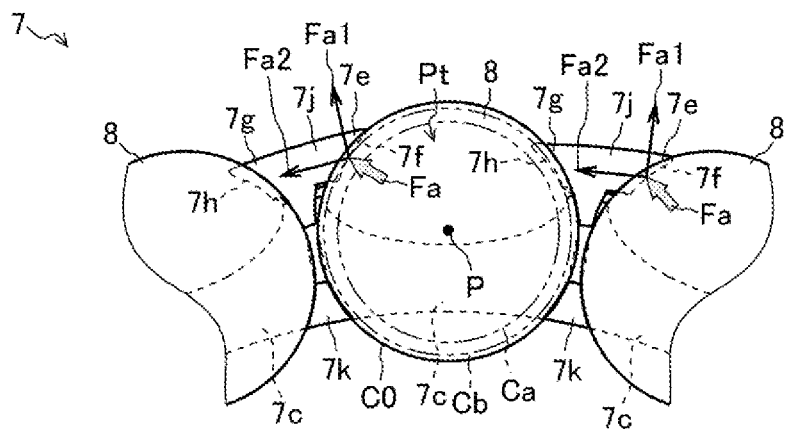
FIG. 7B is a partially enlarged plan view that illustrates a state in which the ball presses the long claw portion of the cage in the bearing device for a vehicle wheel according to the first embodiment, in installing the ball in the cage.

As illustrated in FIG. 7B, when each ball 8 is moved toward the base section 7a, the corresponding long claw portion 7e slides on the outer peripheral face of the ball 8 toward the outer peripheral circle C0 of the ball 8 when viewed from the axial direction. At this time, in each pillar section 7b, the outer pillar 7j is expanded radially outward and to the other side in the circumferential direction by the one-side external force Fa applied to the long claw portion 7e until the short claw guideway 7h comes into contact with the outer peripheral face of the ball 8 on the other side. In other words, in the adjacent pillar sections 7b, the outer pillars 7j are elastically deformed in the circumferential direction in which the outer pillars 7j are apt to be deformed since the ball 8 does not concurrently come into contact with the long claw portion 7e of the one pillar section 7b and the short claw portion 7g of the other pillar section 7b.

Figure 7C:
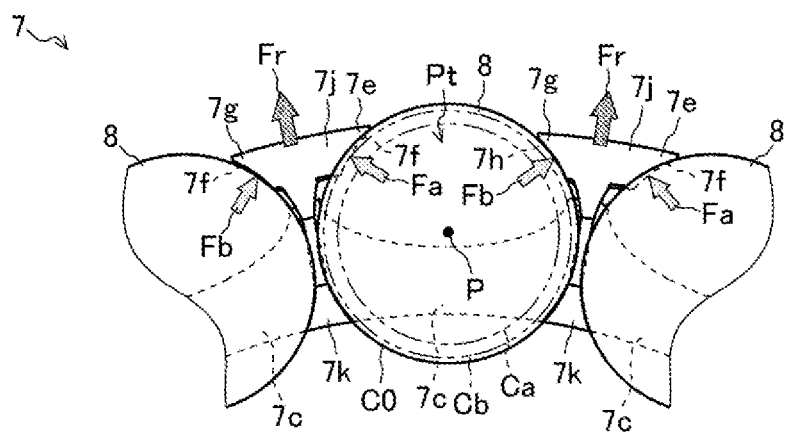
FIG. 7C is a partially enlarged plan view that illustrates a state in which the ball presses the long claw portion and a short claw portion of the cage in the bearing device for a vehicle wheel according to the first embodiment, in installing the ball in the cage.

As illustrated in FIG. 7C, when each short claw guideway 7h comes into contact with the outer peripheral face of the corresponding ball 8, the short claw portion 7g receives, from the ball 8, another-side external force Fb (a light gray arrow) applied in a direction from the center of the ball 8 to the contact position of the short claw guideway 7h with the outer peripheral face. As a result, each outer pillar 7j receives a resultant force Fr (a dark gray arrow) that is a combination of the one-side external force Fa with the other-side external force Fb and is directed radially outward.

When each ball 8 is further moved toward the base section 7a, the corresponding long claw portion 7e of the one pillar section 7b and the corresponding short claw portion 7g of the other pillar section 7b slide on the outer peripheral face of the ball 8 toward the outer peripheral circle C0 of the ball 8 when viewed from the axial direction. At this time, the outer pillars 7j are expanded radially outward until the long claw guideway 7f of the one outer pillar 7j and the short claw guideway 7h of the other outer pillar 7j reach the outer peripheral circle C0. Each outer pillar 7j is thus elastically deformed by about 0.15 times larger than the diameter D0 of the corresponding ball 8 (by the radius of the given imaginary circle Ca having the diameter Da) at maximum by the elastic deformation directed to the other side in the circumferential direction and the elastic deformation directed radially outward. In each outer pillar 7j, the circumferential rigidity is lower than the radial rigidity because of the shape of the outer pillar 7j. Therefore, the elastic deformation in the circumferential direction suppresses forces required for the long claw guideway 7f of the one pillar section 7b and the short claw guideway 7h of the other pillar section 7b to reach the outer peripheral circle C0.

A stress owing to the deformation directed radially outward and a stress owing to the deformation directed to the other side in the circumferential direction generate at each pillar section 7b. At this time, the stresses generating at each pillar section 7b are restricted to be less than a permissive limit stress set based on the characteristics of a material for the cage 7 since the shapes of the long claw portion 7e and notched section 7i are limited.

When each ball 8 reaches the guideways 7d of the corresponding pillar sections 7b, the long claw portion 7e of the one pillar section 7b and the short claw portion 7g of the other pillar section 7b slide on the outer peripheral face of the ball 8 radially inward from the outer peripheral circle C0 of the ball 8 when viewed from the axial direction, by the elastic forces of the outer pillars 7j. The ball 8 is moved axially along the guideways 7d to reach the concave curved face 7c. The long claw portion 7e and the short claw portion 7g stop at the positions overlapping the given imaginary circle Ca having the diameter Da and the imaginary circle Cb when viewed from the axial direction. The concave curved face 7c and the guideways 7d restrict the radially outward movement and radially inward movement of the ball 8. In addition, the long claw portion 7e and the short claw portion 7g restrict the axial movement of the ball 8. The balls 8 are thus retained in the cage 7 at equidistant spacings.

According to this configuration, in the adjacent pillar sections 7b, the long claw portion 7e of the one pillar section 7b and the short claw portion 7g of the other pillar section 7b are not in contact with the corresponding ball 8 concurrently. Therefore, the cage 7 is elastically deformed in the circumferential direction in which the outer pillars 7j are apt to be deformed. In the adjacent outer pillars 7j, the elastic deformation in the circumferential direction in which the outer pillars 7j are apt to be deformed suppresses forces required for the long claw guideway 7f of the one outer pillar 7j and the short claw guideway 7h of the other outer pillar 7j to reach the corresponding outer peripheral circle C0. In the cage 7, the upper limit concerning the size of the region where the long claw portion 7e of the one pillar section 7b and the short claw portion 7g of the other pillar section 7b overlap the ball 8 when viewed from the axial direction is set in relation to the shapes of the long claw portion 7e and short claw portion 7g. Therefore, the amount of deformation of each outer pillar 7j is limited within a certain range. The bearing device for a vehicle wheel is thus capable of maintaining the force to retain the balls 8 and improving the ease of installing the balls 8 in the cage 7 while also increasing the number of balls 8.

Figure 8A:
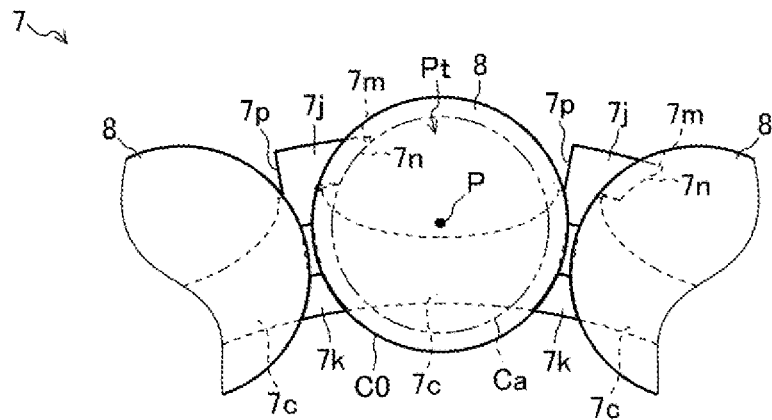
FIG. 8A is a partially enlarged plan view that illustrates a state in which a ball is in contact with a long claw portion of a cage in a bearing device for a vehicle wheel according to a second embodiment, in installing the ball in the cage.
Figure 8B:
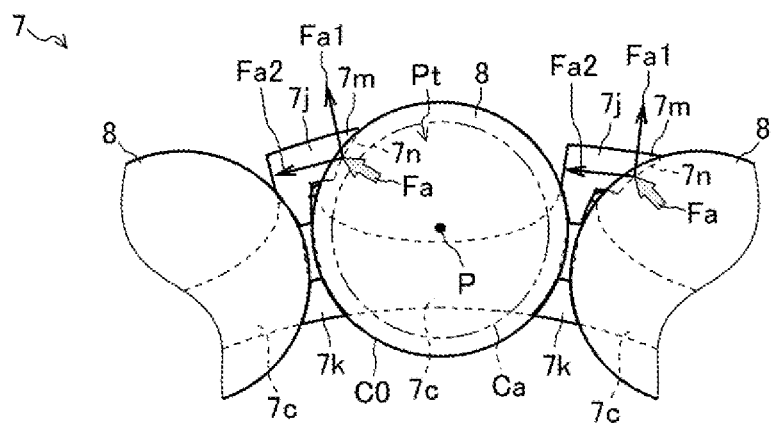
FIG. 8B is a partially enlarged plan view that illustrates a state in which the ball presses the long claw portion of the cage in the bearing device for a vehicle wheel according to the second embodiment, in installing the ball in the cage.
Figure 8C:
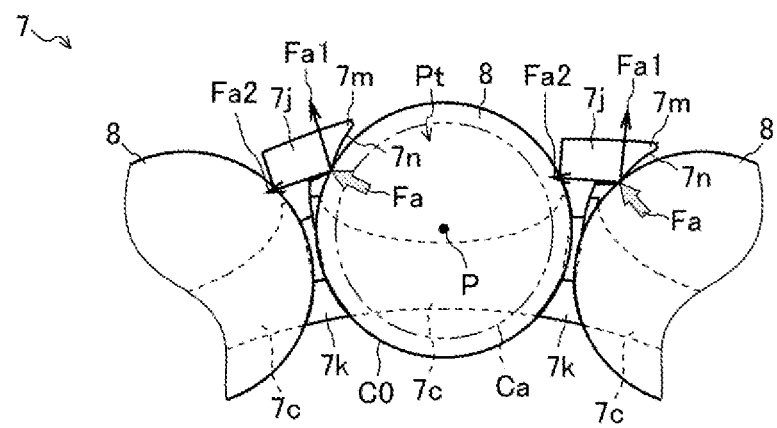
FIG. 8C is a partially enlarged plan view that illustrates a state in which the ball presses the long claw portion and a short claw portion of the cage in the bearing device for a vehicle wheel according to the second embodiment, in installing the ball in the cage.

With reference to FIGS. 8A, 8B, and 8C, next, a description will be given of a bearing device for a vehicle wheel 1 according to a second embodiment of the present invention. In the bearing device for a vehicle wheel 1 according to the following embodiment, components to be applied in place of those in the bearing device for a vehicle wheel 1 illustrated in FIGS. 1 to 7C are denoted with the same designations, figure numbers, and reference signs as those in the bearing device for a vehicle wheel 1. In the following embodiment, configurations similar to those described in the foregoing embodiment are not described in detail, but configurations different from those described in the foregoing embodiment will be described mainly.

As illustrated in FIG. 8A, in a cage 7 of the bearing device for a vehicle wheel 1, an outer pillar 7j of each pillar section 7b has, on its distal end, a claw portion 7m projecting circumferentially toward a pillar section 7b adjacent to the pillar section 7b on one side in the circumferential direction. The outer pillar 7j also has, in its distal end, a notched face 7p on another side in the circumferential direction. In other words, each outer pillar 7j has the claw portion 7m on one side in the circumferential direction, but has no claw portion on the other side in the circumferential direction. Each claw portion 7m has, when viewed from the axial direction (see FIG. 5A), a distal end that falls within a ring-shaped range having a radial width R1. The ring-shaped range is surrounded with a reference imaginary circle C1 having a diameter D1 about a predetermined position P and an outer peripheral circle C0 of a ball 8 having a diameter D0. The diameter D1 of the reference imaginary circle C1 is set to be not less than 0.7 times the diameter D0 of the ball 8 and less than 1.0 time the diameter D0 of the ball 8.

The claw portion 7m has a pocket Pt-side distal end notched in a chamfered shape so as to fall within the range having the radial width R1. The claw portion has, on its distal end, a guideway 7n. The guideway 7n is an arc face extending along a given imaginary circle Ca having a diameter Da. When viewed from the axial direction, the imaginary circle Ca is larger than the reference imaginary circle C1 having the diameter D1, and is smaller than the outer peripheral circle C0 of the ball 8 having the diameter D0. In the claw portion 7m, the guideway 7n is in closest proximity to a center of the ball 8. In other words, a length between the guideway 7n and the center of the ball 8 is shortest in the claw portion 7m.

Next, a description will be given of a deformed state of the cage 7 in installing balls 8 in the cage 7. It is assumed that the balls 8 are moved only in the axial direction by, for example, a ball inserting tool (not illustrated).

As illustrated in FIG. 8B, in adjacent two of the pillar sections 7b, the corresponding ball 8 is in contact at its outer peripheral face with the guideway 7n of the claw portion 7m of the outer pillar 7j of one of the pillar sections 7b. The guideway 7n is in contact with the ball 8 at a position overlapping the given imaginary circle Ca having the diameter Da. The claw portion 7m receives, from the ball 8, one-side external force Fa (a light gray arrow) applied in a direction from the center of the ball 8 to the contact position of the claw portion 7m with the outer peripheral face. In other words, the outer pillar 7j simultaneously receives, as a component of the one-side external force Fa, a radial component Fa1 directed radially outward and a circumferential component Fa2 directed to another side in the circumferential direction.

As illustrated in FIG. 8C, when each ball 8 is moved toward a base section 7a, the corresponding claw portion 7m slides on the outer peripheral face of the ball 8 toward the outer peripheral circle C0 of the ball 8 when viewed from the axial direction. At this time, in each pillar section 7b, the outer pillar 7j is expanded radially outward and to the other side in the circumferential direction by the one-side external force Fa applied to the claw portion 7m. In other words, each outer pillar 7j has no claw portion on the other side in the circumferential direction, and is therefore elastically deformed in the circumferential direction in which the outer pillar 7j is apt to be deformed.

When each ball 8 reaches guideways 7d of the corresponding pillar sections 7b, the claw portion 7m of one of the pillar sections 7b slides on the outer peripheral face of the ball 8 radially inward from the outer peripheral circle C0 of the ball 8 when viewed from the axial direction, by the elastic force of the outer pillar 7j. The ball 8 is moved axially along the guideways 7d to reach a concave curved face 7c. The claw portion 7m stops at a position overlapping the given imaginary circle Ca having the diameter Da and the imaginary circle Cb when viewed from the axial direction.

According to this configuration, only the claw portion 7m of each outer pillar 7j on the one side in the circumferential direction is in contact with the corresponding ball 8. Therefore, the cage 7 is elastically deformed in the circumferential direction in which each outer pillar 7j is apt to be deformed. In other words, each outer pillar 7j receives suppressed force to be required for the guideway 7n to reach the corresponding outer peripheral circle C0. The bearing device for a vehicle wheel is thus capable of maintaining the force to retain the balls 8 and improving the ease of installing the balls 8 in the cage 7 while also increasing the number of balls 8.

An embodiment of the present invention has been described above. However, the embodiment is merely illustrative; therefore, the present invention is not limited thereto. It is a matter of course that the present invention can be further practiced in various embodiments without departing from the scope of the present invention. The scope of the present invention is indicated by the recitation of the claims, and involves the meaning equivalent to the recitation of the claims, and all changes within the scope. In addition, the present embodiment describes the bearing device for a vehicle wheel 1 having a third generation structure in which the inner raceway surface 3c is directly formed on the outer periphery of the hub ring 3. However, the present invention is not limited thereto. For example, the bearing device for a vehicle wheel 1 may have a second generation structure in which a pair of inner rings 4 are press-fitted and fixed to the hub ring 3 or a first generation structure in which a double row angular contact ball bearing is fitted between a knuckle and a hub ring.

INDUSTRIAL APPLICABILITY

The present invention is applicable to a bearing device for a vehicle wheel.

REFERENCE SIGNS LIST 1 bearing device for vehicle wheel
2 outer ring
3 hub ring
4 inner ring
7 cage
7a base section
7b pillar section
7e long claw portion
7g short claw portion
7i notched section
8 ball

The invention claimed is:
1. A bearing device for a vehicle wheel, comprising:
an outer member having, on an inner periphery thereof, double row outer raceway surfaces;
an inner member including:
a hub ring having, on an outer periphery thereof, a reduced-diameter step portion extending axially; and
at least one inner ring press-fitted to the reduced-diameter step portion,
the inner member having, on an outer periphery thereof, double row inner raceway surfaces facing the double row outer raceway surfaces;
double row balls rollably accommodated between the raceway surfaces of the outer member and the raceway surfaces of the inner member, respectively; and
a cage made of a resin,
the cage including:
a base section having a ring shape; and
a plurality of pillar sections extending axially from the base section and circumferentially arranged at spacings,
the cage having a pocket defined by two adjacent pillar sections and the base section and having a curved face extending along an outer peripheral face of a corresponding one of the balls so as to retain the ball,
wherein
each pillar section includes:
a first claw portion and a second claw portion projecting in opposite circumferential directions toward the pillar sections adjacent to the pillar section, respec- tively, each claw portion having a guideway configured by an arc face guiding a corresponding one of the balls; and a notched section cut toward the base section from a distal end radially inward of the claw portions of the pillar section, the pocket is defined by the first claw portion of one of the two adjacent pillar sections and the second claw portion of the other of the two adjacent pillar sections, when viewed from the axial direction, a shortest length between the first claw portion of the one of the two adjacent pillar sections and a center of the ball is different from a shortest length between the second claw portion of the other of the two adjacent pillar sections and the center of the ball, when viewed from the axial direction, the guideway of the first claw portion of the one of the two adjacent pillar sections is closer to the center of the ball than the guideway of the second claw portion of the other of the two adjacent pillar sections.

2. The bearing device for a vehicle wheel according to claim 1, wherein when viewed from the axial direction, a portion of the first claw portion of the one of the two adjacent pillar sections where the length to the center of the ball is shortest and a portion of the second claw portion of the other of the two adjacent pillar sections where the length to the center of the ball is shortest fall within a ring-shaped range surrounded with an outer peripheral circle of the ball and an imaginary circle having a diameter that is not less than 0.7 times and less than 1.0 time a diameter of the ball with the center of the ball defined as a center of the imaginary circle.

3. The bearing device for a vehicle wheel according to claim 1, wherein when viewed from the axial direction, a sum of the shortest length between the first claw portion of the one of the two adjacent pillar sections and the center of the ball and the shortest length between the second claw portion of the other of the two adjacent pillar sections and the center of the ball is 0.7 times larger than a diameter of the ball and is not more than 0.85 times the diameter of the ball.

4. A bearing device for a vehicle wheel, comprising:

an outer member having, on an inner periphery thereof, double row outer raceway surfaces;

an inner member including:

a hub ring having, on an outer periphery thereof, a reduced-diameter step portion extending axially; and at least one inner ring press-fitted to the reduced-diameter step portion, the inner member having, on an outer periphery thereof, double row inner raceway surfaces facing the double row outer raceway surfaces;

double row balls rollably accommodated between the raceway surfaces of the outer member and the raceway surfaces of the inner member, respectively; and a cage made of a resin, the cage including:

a base section having a ring shape; and a plurality of pillar sections extending axially from the base section and circumferentially arranged at spacings, the cage having a pocket defined by two adjacent pillar sections and the base section and having a curved face extending along an outer peripheral face of a corresponding one of the balls so as to retain the ball, wherein each pillar section of the cage includes:

a first claw portion and a second claw portion projecting in opposite circumferential directions toward the pillar sections adjacent to the pillar section, respectively, each claw portion having a guideway configured by an arc face guiding a corresponding one of the balls; and a notched section extending from a distal end of the pillar section toward the base section, the pocket is defined by the first claw portion of one of the two adjacent pillar sections and the second claw portion of the other of the two adjacent pillar sections, when viewed from the axial direction, one of the claw portions defining the pocket has a distal end falling within a ring-shaped range surrounded with an outer peripheral circle of the ball and a reference imaginary circle having a predetermined radius with a center of the ball defined as a center of the reference imaginary circle, and when viewed from the axial direction, the guideway of the first claw portion of the one of the two adjacent pillar sections is closer to the center of the ball than the guideway of the second claw portion of the other of the two adjacent pillar sections.

* * * * *